United States Patent [19]

Somezawa et al.

[11] 4,431,703
[45] Feb. 14, 1984

[54] MAGNETIC RECORDING MEDIUM

[75] Inventors: Masashi Somezawa, Sendai; Shigeo Kimura, Chuo Tagajyo; Yuji Hinoto; Hiroshi Yoshioka, both of Annaka, all of Japan

[73] Assignees: Sony Corporation; Shin-Etsu Chemical Co. Ltd., both of Tokyo, Japan

[21] Appl. No.: 443,574

[22] Filed: Nov. 22, 1982

[30] Foreign Application Priority Data

Nov. 26, 1981 [JP] Japan .................... 56/189617

[51] Int. Cl.$^3$ ............................. H01F 10/02
[52] U.S. Cl. .................... 428/447; 428/694; 428/695; 428/900
[58] Field of Search ............ 428/447, 694, 695, 900

Primary Examiner—Bernard D. Pianalto
Attorney, Agent, or Firm—Hill, Van Santen, Steadman & Simpson

[57] ABSTRACT

A magnetic recording medium having a layer containing as a lubricant one or more organo-polysiloxane compounds having the following formula (I):

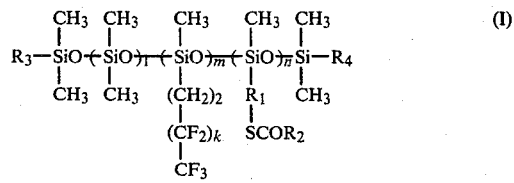

(wherein $R_1$ is a divalent hydrocarbon residue having 1 to 5 carbon atoms; $R_2$ is a monovalent hydrocarbon residue having from 7 to 21 carbon atoms; $R_3$ and $R_4$ may be the same or different and are $-CH_3$, $-(CH_2)_2(CF_2)_kCF_3$ or $-R_1SCOR_2$; k is 0 or an integer ranging from 1 to 12; each of l, m and n is independently 0 or an integer ranging from 1 to 200 and the sum of $1+m+n$ is up to 300, with the proviso that when at least one of $R_3$ and $R_4$ is the group $-R_1SCOR_2$, each of l, m and n may be 0 and that when at least one of $R_3$ and $R_4$ is a group other than the group $-R_1SCOR_2$, each of l and m may be 0 but n is our integer ranging from 1 to 200).

14 Claims, 7 Drawing Figures

MAGNETIC RECORDING MEDIUM

BACKGROUND OF THE INVENTION

1. Field of the Invention

This invention is in the field of magnetic recording media including a non-magnetic base and a magnetic layer containing magnetizable particles dispersed in a binder. The invention is concerned with an improved lubricating layer consisting of one or more organopolysiloxane compounds.

2. Description of the Prior Art

A magnetic recording medium which is used for audio recording, video recording, or other magnetic recording purposes during use is in contact with guide members, magnetic heads, and the like. In the case of a video tape recorder, where high tape velocities are encountered, the tape must have sufficiently high wear resistance and a relatively small friction coefficient if it is to run smoothly and steadily for a long time. Moreover, the magnetic powder layer including magnetizable particles on such a recording medium must be sufficiently bound to the base to resist shedding or loosening of the powder during use. The magnetic tape must also have good splicing ability.

Magnetic recording media which have relatively high friction coefficients vibrate at the guide members and/or the magnetic heads during recording and/or reproducing so that the recorded signals or the reproduced signals deviate from the original signals with respect to frequency. In some cases, fluttering of the magnetic recording medium can occur to produce the so-called "Q" sound due to the vibration of the recording media.

Various attempts have been made to overcome the above-described defects and to impart lubricity or smoothness to a magnetic recording media, but no completely satisfactory lubricant for magnetic recording media has yet been developed. For example, it has been suggested to use solid lubricants such as molybdenum disulfide, graphite or a wax such that the lubricant is mixed into the magnetic layer containing a magnetic powder such as gamma-$Fe_2O_3$, and a binder, such as polyvinyl chloride. Such solid lubricants are ineffective to improve the durability of the magnetic recording media. When a large quantity of the solid lubricant is mixed into the magnetic layer, the magnetic performance of the recording media is impaired. It has also been suggested to use lubricants such as higher fatty acids or esters, or paraffinic hydrocarbons and silicone oils such as dimethylsilicone oil or diphenylsilicone oil as lubricating agents. These lubricants do not provide sufficient durability and lubricity so that magnetic recording meida containing these lubricants cannot be effectively used in cassettes for video tape recorders. Magnetic recording media containing large quantities of such lubricants may cause "bleeding" or "blooming" resulting from the lubricant oozing or diffusing onto the surface of the magnetic layer and becoming separated therefrom. Bleeding or blooming which occur on the magnetic layer may cause a stick-slip in which layers of tape wound upon themselves stick to each other.

It has further been suggested that certain organopolysilicone compounds could be employed as lubricants for providing lubricity to magnetic recording media. For example, U.S. Pat. No. 3,993,846 to Higuchi et al discloses a polyoxyalkylene substituted silicone compound having the formula:

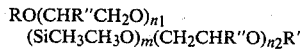
$$RO(CHR''CH_2O)_{n_1}(SiCH_3CH_3O)_m(CH_2CHR''O)_{n_2}R'$$

(wherein R and R' stand for an aliphatic hydrocarbon group having from 8 to 18 carbon atoms, R'' is a hydrogen atom or methyl group, m is an integer ranging from 1 to 15 and $n_1$ and $n_2$ are integers whose sums range from 2 to 16).

This lubricant exhibits considerable promise in providing an improved magnetic recording medium wherein at least some if not all of the aforementioned prior art problems are alleviated.

U.S. Pat. No. 4,007,314 to Higuchi et al discloses an organosilicone lubricant compound having the formula:

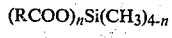
$$(RCOO)_nSi(CH_3)_{4-n}$$

(wherein R is an aliphatic hydrocarbon group containing from 7 to 17 carbon atoms and n is an integer ranging from 1 to 3).

This lubricant also exhibits considerable promise in providing a magnetic recording medium with improved lubrication properties.

Hirano et al in U.S. Pat. No. 4,131,717 disclosed a magnetic recording medium including a non-magnetic base and a magnetic layer thereon wich contains and/or is coated with an organopolysiloxane having an average unit represented by the formula:

$$(CH_3)(RO)_n(R'COO)_mSiO_{\frac{3-n-m}{2}}$$

(wherein R is a monovalent hydrocarbon group having from 1 to 5 carbon atoms, R' is a mono-valent aliphatic bydorcarbon group having from 7 to 17 carbon atoms, n is zero or a positive number, m is a positive number provided that n+m is less than 3 and the number of Si atoms in a molecule of such organopolysiloxane ranges from 2 to 8).

Magnetic recording media containing such lubricants exhibit a substantially reduced dynamic friciton coefficient and a substanitally reduced tendency for the magnetic layer to lose its magnetic properties, along with an improved splicing ability.

In U.S. Pat. No. 4,007,313 to Higuchi et al there is disclosed a lubricant for magnetic recording media comprising an organosilicone-fluoride compound having the formula:

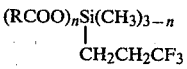
$$(RCOO)_nSi(CH_3)_{3-n}$$
$$|$$
$$CH_2CH_2CF_3$$

(wherein R is an aliphatic hydrocarbon group having from 7 to 17 carbon atoms and n is an integer ranging from 1 to 3).

This lubricant also exhibits considerable promise in providing an improved magnetic recording medium.

While the lubricants disclosed in the above prior patents are improvements over prior art lubricants, it is nevertheless desirable to provide even further improved lubricants for use with magnetic recording media.

SUMMARY OF THE INVENTION

The present invention seeks to provide an improved magnetic recording medium containing a lubricant that imparts improved lubricity or smoothness to the medium. The lubricant provides durability to the recording medium permitting it to run smoothly and steadily while being in contact with guide members and magnetic heads. The magnetic recording medium of the present invention contains a lubricant which can improve and stabilize magnetic performance in the still mode, which tends to vary over a period of time.

The lubricant used in accordance with the present invention provides improved lubricating properties to a magnetic recording medium whereby the defects and disadvantages prevailing in conventional and prior art lubricants can be substantially reduced.

In accordance with the present invention, a magnetic recording medium is provided with a non-magnetic base and a magnetic layer formed thereon which includes magnetizable particles dispersed in a binder. The base or the overlying layer contains an improved lubricant which provides improved properties as hereinabove set forth.

The lubricants used in the practice of the present invention are organo-polysiloxane compounds represented by the following formula (I):

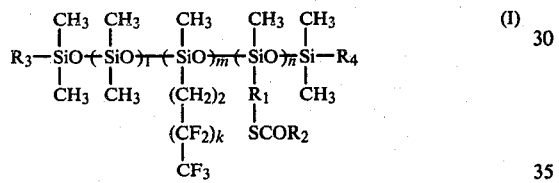

(wherein $R_1$ is a divalent hydrocarbon residue having 1 to 5 carbon atoms; $R_2$ is a monovalent hydrocarbon residue having from 7 to 21 carbon atoms; $R_3$ and $R_4$ may be the same or differenct and are $-CH_3$, $-(CH_2)_2(CF_2)_kCF_3$ or $-R_1SCOR_2$; k is 0 or an integer ranging from 1 to 12; each of l, m and n is independently 0 or an integer ranging from 1 to 200 and the sum of $l+m+n$ is up to 300, with the proviso that when at least one of $R_3$ and $R_4$ is the group $-R_1SCOR_2$, each of l, m and n may be 0 and that when at least one of $R_3$ and $R_4$ is a group other than the group $-R_1SCOR_2$, each of l and m may be 0 but n is an integer ranging from 1 to 200).

DESCRIPTION OF THE PREFERRED EMBODIMENTS

Figure 1A:
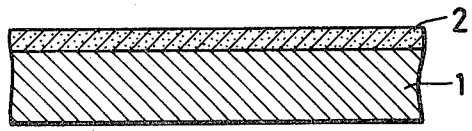
FIGS. 1A through 1E are examples illustrating magnetic recording media which are provided with improved layers according to the present invention in various locations.

The present invention provides an improved magnetic recording medium having a non-magnetic base and a magnetic layer thereon comprising magnetic or magnetizable particles dispersed in a binder, the base being provided with a lyaer which contains at least one of the lubricants described in this application.

The organo-polysiloxane compounds which can be employed for the purposes of the present invention may be represented by the following formula (I):

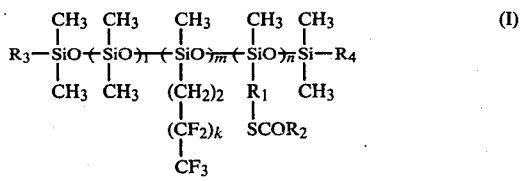

(wherein $R_1$ is a divalent hydrocarbon residue having 1 to 5 carbon atoms; $R_2$ is a monovalent hydrocarbon residue having from 7 to 21 carbon atoms; $R_3$ and $R_4$ may be the same or different and are $-CH_3$, $-(CH_2)_2(CF_2)_kCF_3$ or $-R_1SCOR_2$; k is 0 or an integer ranging from 1 to 12; each of l, m and n is independently 0 or an integer ranging from 1 to 200 and the sum of $l+m+n$ is up to 300, with the proviso that when at least one of $R_3$ and $R_4$ is the group $-R_1SCOR_2$, each of l, m and n may be 0 and that when at least one of $R_3$ and $R_4$ is a group other than the group $-R_1SCOR_2$, each of l and m may be 0 but n is an integer ranging from 1 to 200).

The term "divalent hydrocarbon residue" referred to hereinabove is intended to mean a divalent, straight chained or branched chained, saturated or unsaturated, aliphatic hydrocarbon residue. The hydrocarbon residue may include a divalent, straight or branched chained, lower alkylene group or lower alkenylene group. The alkylene group referred to herein may include, for example, methylene, ethylene, propylene, methylethylene, ethylmethylene, butylene, pentylene, methylpropylene, ethylpropylene, methylbutylene and propylmethylene. The alkenylene group referred to herein may include, for example, ethenylene, propenylene, methylethenylene, butenylene, methylbutenylene, heptenylene and methylpropenylene. The term "monovalent hydrocarbon residue" may include a monovalent, straight or branched chain, saturated or unsaturated hydrocarbon residue. The monovalent hydorcarbon residue may include a monovalent, straight or branched chain, higher alkyl or higher alkenyl group. The higher alkyl group may include, for example, heptyl, octyl, nonyl, decyl, undecyl, tridecyl, pentadecyl, heptadecyl, nonadecyl, heneicosyl, methylheptyl, ethylheptyl, methylnonyl, methylethylhexyl, methyltridecyl, propylhexadecyl, dthylnonadecyl and methyleicosyl. The higher alkenyl group may include, for example, heptenyl, octenyl, nonenyl, decenyl, undecenyl, tridecenyl, pentadecenyl, heptadecenyl, nonadecenyl, heneicosenyl, methylhexenyl, etylpentenyl, methylmethylhexenyl, propylheptenyl, methyldodecenyl, ethyltridecenyl, methyltetradecenyl, etylhexadecentyl, methyloctadecenyl and ethylnonadecenyl.

In the aforesaid formula (I), it is preferred to restrict the quotient obtained by dividing n by the sum of $l+m+n+2$ to a value equal to or greater than 0.2.

The organo-polysiloxane compounds to be employed as lubricants in the practice of the present invention may be prepared by several different procedures, for example, as follows:

The organo-polysiloxane compounds of formula (I) may be prepared by reacting a compound containing a mercapto group represented by the following formula (II):

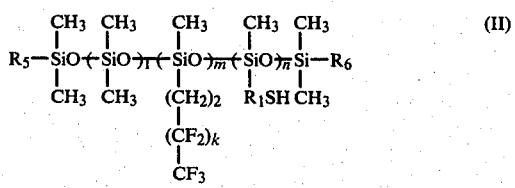

(wherein $R_5$ and $R_6$ may be the same or different and are —$CH_3$, —$CH_2CH_2(CF_2)_kCF_3$ or —$R_1SH$; and $R_1$, k, l, m and n, have the same meanings as defined above) with a fatty acid halide represented by the formula (III):

$$R_2 COX \qquad (III)$$

(wherein X is a halogen atom and $R_2$ has the same meaning as defined above) in the presence of a deoxidizer such as triethylamine and pyridine.

In the compound of the formula (III), the term "halogen atom" referred to herein is intended to mean, for example, chlorine or bromine.

It will be apparent to those skilled in the art that the organopoysiloxane compounds represented by the formula (I) above can also be prepared by methods other than that described above.

In the organo-polysiloxane compounds of formula (I), where a thioester moiety represented by the group —$SCOR_2$ is bound through the divalent hydrocarbon residue represented by the group —$R_1$— having from 1 to 5 carbon atoms, the binding of the thioester group to the Si atom is rendered much stronger than in instances where the thioester group is joined directly to the Si atom without the interposition of the $R_1$ group because hydrolysis may cause the bond between the thioester group and the Si atom to decompose and eliminate the thioester group which might otherwise provide lubricating properties to the magnetic recording medium. Accordingly, the presence of the $R_1$ between the thioester group and the Si atom serves to a great extent to reduce the deterioration in lubricating properties with passage of time. Although the number of carbon atoms in the $R_1$ group is restricted to 5 as a matter of convenience because it is hard to provide substituents having more than 5 carbon atoms, there is no reason in theory why the substituent cannot have more than 5 carbon atoms and provide improved lubricating properties in the organo-polysiloxane compounds.

The number of carbon atoms in the group $R_2$ of the acyloxy group preferably ranges from 7 to 21 because a compound having an acyloxy group with less than 7 carbon atoms does not provide a sufficient decrease in the dynamic friction coefficient of the magnetic recording medium and tends to decrease durability of the same. An organo-polysiloxane compound having an acyloxy group of more than 21 carbon atoms, on the other hand, tends to cause excessive bleeding or blooming because it may cause a decrease in the solubility in the magnetic paint or cause an increase in the melting point of such compound.

It is assumed that the presence of fluorine atoms in the substituent —$CH_2CH_2(CF_2)_kCF_3$ and/or the substituent —$CH_2CH_2(CF_2)_kCF_3$ tends to decrease the energy which may be produced during use on the surface of a magnetic layer or a coating containing an organo-polysiloxane compound of formula (I) leading to a decrease in the dynamic friction coefficient of a magnetic recording medium provided with such compound. An organo-polysiloxane compound having a substituent with more than 12 carbon atoms substituted with fluorine atoms tends to cause a decrease in solubility in magnetic paint and tends to raise the melting point of such compounds. An organo-polysiloxane compound having an SiO moiety or moieties with each of all of the symbols l, m and n exceeding the upper range or ranges tends to cause a decrease in compatibility with a binder.

In accordance with the present invention, the organo-polysiloxane lubricants of formula (I) may be added to or intermixed with magnetic particles and binders used in forming the magnetic layer formed on the non-magnetic base or the organo-polysiloxane lubricants may be coated onto a magnetic layer as top coat. The non-magnetic base may be provided with a back coating layer comprising the organo-polysiloxane lubricant on the surface opposite to the surface on which the magnetic layer is formed or the organo-polysiloxane lubricant may be added to or intermixed with a back coat containing, for example, corbon or coated onto a back coat as a back top coat.

Figure 1B:
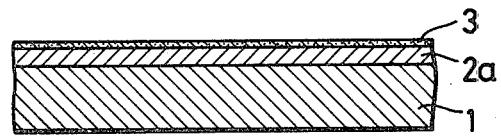
Figure 1C:
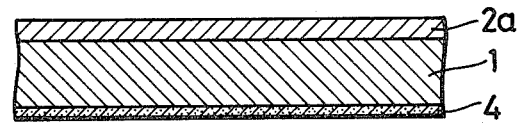
Figure 1D:
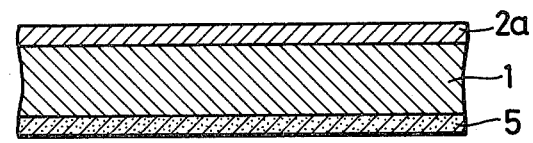
Figure 1E:
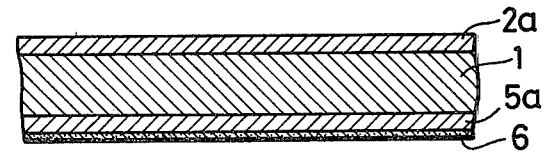

FIG. 1A illustrates an example where the organo-polysiloxane lubricant of formula (I) is coated on a non-magnetic base 1 as a magnetic layer 2 containing magnetizable particles and a binder. FIG. 1B illustrates a top coat 3 containing the lubricant coated on the magnetic layer 2a. FIG. 1C illustrates an example wherein the non-magnetic base 1 has a magnetic layer 2a thereon and is provided with a back coating layer 4 containing the lubricant on the surface of the non-magnetic base opposite to the surface coated with the magnetic layer 2. FIG. 1D shows an example of coating a back coat 5 containing the lubricant on the surface of the non-magnetic base 1 with the magnetic layer 2a formed on the surface thereof opposite to the surface on which the back coat 5 is coated. FIG. 1E illustrates an example where a back top coat 6 containing the lubricant is formed on a conventional back coat 5a.

In instances where the organo-polysiloxane lubricant of formula (I) is added within a magnetic layer as shown in FIG. 1A it is preferred that the amount of the organo-polysiloxane compound range from about 0.1 to about 7 parts by weight per 100 parts by weight of magnetizable particles. The back coat 5 as shown in FIG. 1D may preferably contain lubricant in an amount of about 0.5 to 5 parts by weight. In embodiments where the organo-polysiloxane compound of formula (I) is employed for a top coat or a back top coat, the amounts of organo-polysiloxane lubricant may preferably range from about 1 to 1,000 mg/m². It should further be noted that the organo-polysiloxane lubricants of formula (I) may be employed singly or in a mixture thereof or with a lubricant of the conventional type.

The magnetic powder or magnetizable particles to be used in combination with the organopolysiloxane compound of the formula (I) for forming a magnetic layer in magnetic recording media in accordance with the present invention may be composed of any available magnetic or magnetizable material, such as gamma hematite (r-$Fe_2O_3$); magnetite ($Fe_3O_4$); iron oxides of non-stoichiometric oxidation compounds between gamma hematite and magnetite; gamma hematite or magnetite doped with non-ferrous atoms, such as cobalt; chromium dioxide ($CrO_2$); barium ferrite; magnetic or magnetizable alloys, such as an iron-cobalt alloy (Fe-Co), iron nickel alloy (Fe-Ni), iron-cobalt-nickel alloy (Fe-Co-Ni), iron-cobalt-boron alloy (Fe-Co-B), iron-cobalt-chromium-boron alloy (Fe-Co-Cr-B) manganese-bismuth alloy (Mn-Bi), manganese-aluminum alloy (Mn-Al) or iron-cobalt-vanadium alloy (Fe-Co-V); iron nitride; mixtures of the above or other magnetic or magnetizable terials.

The binder used in magnetic recording media produced in accordance with the present invention may be any resinous binder which can be employed for this purpose. The resinous binder may include, for example, vinyl chloride-vinyl acetate copolymers, vinyl chloride-vinyl acetate-vinyl alcohol copolymers, vinyl chloride-vinyl acetate-maleic acid copolymers, vinyl chloride-vinylidene chloride copolymers, vinyl chloride-acrylonitrile copolymers, acrylic acid ester-acrylonitrile copolymers, acrylic acid ester-vinylidne chloride copolyers, methacrylic acid ester-vinylidene chloride copolymers, methacrylic acid ester-styrene copolymers, thermplastic polyurethane resins, phenoxy resins, polyvinyl fluoride, vinylidene chlorideacrylonitrile copolymers, butadiene-acrylonitrile copolymers, acrylonitrile-butadiene-acrylic acid copolymers, acrylonitrilebutadiene-methacrylic acid copolymers, polyvinyl butyral, polyvinyl acetal, cellulose derivatives, styrene-butadiene copolymers, polyester resins, phenol resins, epoxy resins, thermosetting polyurethane resins, urea resins, melamine resins, alkyd resins, urea-formaldehyde resins, mixtures thereof or other like resinous binders.

A reinforcement material capable of being used in the magnetic layer of magnetic recording mdeia in accordance with the present invention may include, for example, aluminum oxide, chromium oxide, silicon oxide or mixtures thereof.

Magnetic recording media produced in accordance with the present invention may also contain antistatic agents of the type that can be used with magnetic recording media. An example of suitable antistatic agent is finely divided carbon black. Further, dispsersing agents, such as lecithin and the like, may be added to a magnetic layer of a magnetic recording medium in accordance with the present invention.

The organic solvent to be used with the magnetic powder or magnetizable particles and the binder for preparing a magnetic paint to be coated on a non-magnetic base may include, for example alcohols, such as methanol, ethanol, propanol and butanol; ketones, such as acetone, methylethylketone, methylisobutylketone and cyclohexanone; esters, such as methyl acetate, ethyl acetate, butyl acetate, ethyl lactate and glycol diacetate; ethers, such as monoethylether; glycol ethers, such as ethylene glycol monoethyl ether, ethylene glycol dimethyl ether and dioxane; aromatic hydrocarbons, such as benzene, toluene and xylene; aliphatic hydrocarbons, such as hexane and heptane; nitropropane; mixtures thereof or other suitable organic solvents.

The magnetic recording medium in accordance with the present invention may comprise any of the known forms, such as magnetic recording tapes having a flexible non-magnetic film base and magetic discs having a relatively rigid non-magentic base. The flexible non-magnetic film bases may include, for example, polyesters, such as polyethylene therephthalate; polyolefins, such as polypropylene; cellulose derivatives, such as celluose diacetate and cellulose triacetate; polycarbonates; polyvinyl chloride; polyimides; metallic materials, such as aluminum and copper; papers; or any other suitable materials. The rigid non-magnetic bases may be composed of, for example, a ceramic or a metal, such as aluminum plate.

In embodiments where the organo-polysiloxane compound of the formula (I) is employed in the back coat of a magnetic recording medium in accordance with the invention, the back coat may comprise, for example, carbon, such as furnace carbon, channel carbon, acetylene carbon, thermal carbon and lamp carbon; inorganic pigments, such a gamma-FeOOH, alpha-Fe$_2$O$_3$, Cr$_2$O$_3$, TiO$_2$, ZnO, SiO, SiO$_2$.2H$_2$O, Al$_2$O$_3$.2SiO$_2$.2H$_2$O, 3MgO.4SiO$_2$. H$_2$O, MgCO$_3$.Mg(OH)$_2$.3H$_2$O, Al$_2$O$_3$ and Sb$_2$O$_3$.

In instances where the organo-polysiloxane compound of the formula (I) is employed in the top coat formed on the surface of the magentic layer or the back coat or in the coating layer coated on the surface of the non-magnetic base, the organo-polysiloxane lubricant or lubricants may be added to or intermixed with one or more of the aforesaid binders in one or more of the aforementioned organic solvents.

The following organo-polysiloxane compounds which were employed in the working examples in the practice of the present invention were prepared as follows:

Preparation of Organo-polysiloxane Compound I:

An organo-polysiloxane compound I having the following formula was prepared:

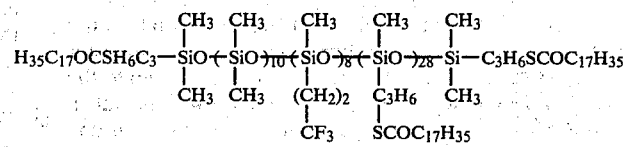

A mixture of 200 grams of an organo-polysiloxane having the following formula:

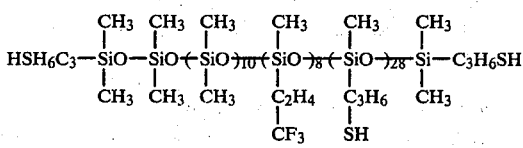

107 grams of triethylamine and 800 grams of toluene was charged into a four-necked flask equipped with a reflux condenser, a thermometer, a stirrer and a dropping funnel and heated to 30°-40° C. To this mixture maintained at this temperature was added dropwise 303 grams of stearic acid chloride with stirring over one hour.

After the dropwise addition of stearic acid chloride the solution was aged at 60° C. for 2 hours. The reaction product was washed with 5% aqueous hydrochloric acid and then with 5% aqueous solution of sodium hydrogencarbonate to remove unchanged triethylamine and the acid chloride. Then, the resulting toluene solution was dried over anhydrous sodium sulfate and toluene was then removed under reduced pressure to give 425 grams of pale yellow wax-like product which was found to have a melting point of 44° C. and was determined to have the structure as hereinabove set forth by elementary analysis and measurements for its infrared absorption spectrum (IR) and nuclear magnetic resonance (NMR).

Preparation of Organo-polysiloxane Compounds II--VIII

The same procedures as in the preparation of organo-polysiloxane compound I were followed to yield the following organo-polysiloxane compounds II-VIII:

Compound II:

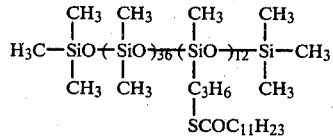

Refractive index (at 25° C.) = 1.4520
Viscosity (at 25° C.) = 533 cSt

Compound III:

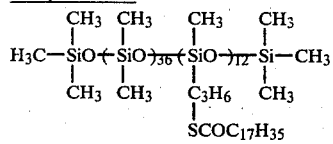

Melting point = 47° C.

Compound IV:

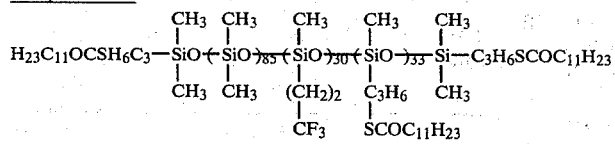

Refractive index (at 25° C.) = 1.4405
Viscosity (at 25° C.) = 8,336 cSt

Compound V:

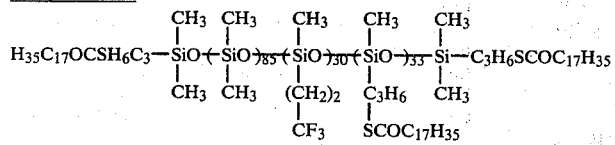

Melting point = 42° C.

Compound VI:

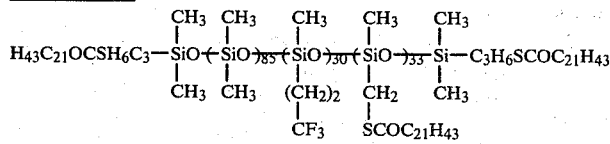

Melting point = 53° C.

Compound VII:

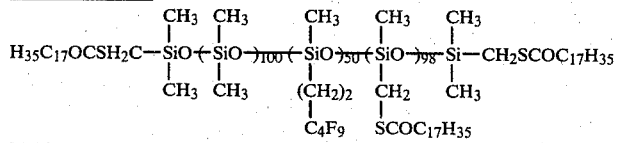

Melting point = 49° C.

Compound VIII:

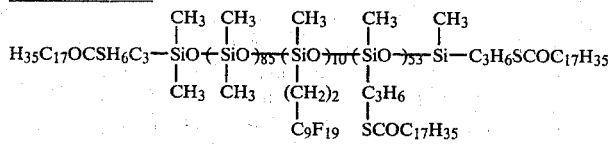

Melting point = 43° C.

A magnetic paint composition which was employed for all the working examples for the magnetic recording media in accordance with the present invention had the following components:

| Components | Parts by weight |
| --- | --- |
| gamma-Fe$_2$O$_3$ | 100 |
| vinyl chloride-vinyl acetate copolymer (trade name "VAGH", manufac- | 18 |

-continued

| Components | Parts by weight |
|---|---|
| tured by Union Carbide Corp.) | |
| Polyurethane resin | 12 |
| (trade name "Estan 5702", | |
| manufactured by | |
| B. F. Goodrich Co.) | |
| Carbon (antistatic agent) | 0.5 |
| Lecithin (dispersing agent) | 1.0 |
| Solvents | |
| Methylethylketone | 150 |
| Methylisobutylketone | 150 |

EXAMPLE 1

To the aforesaid magnetic paint composition were added 2.0 parts by weight of Compound I per 100 parts by weight of gamma-$Fe_2O_3$, and the mixture was ball milled for 24 hours. After filtration, 3 parts by weight of isocyanate were added thereto and the mixture was stirred for 30 minutes. The resulting mixture was then coated on a polyethylene terephthalate film base 12 microns thick so as to give a dry film 5 microns thick. The film base was oriented and rolled upon itself after drying. The rolled film was then subjected to surface treatment and cut to a half inch.

The tape thus prepared was then measured for its "still" performance and dynamic friction coefficient. The results are shown in Table I below.

The tape was also measured for variations in "still" performance with time in an atmoshere having a temperature of 45° C. and a relative humidity of 80%. The results are shown in FIG. 2.

For comparison, a tape obtained in comparative Example 3 as described herein below was measured for variations in still performance with time in the same way. The results are shown in FIG. 2.

Figure 2:
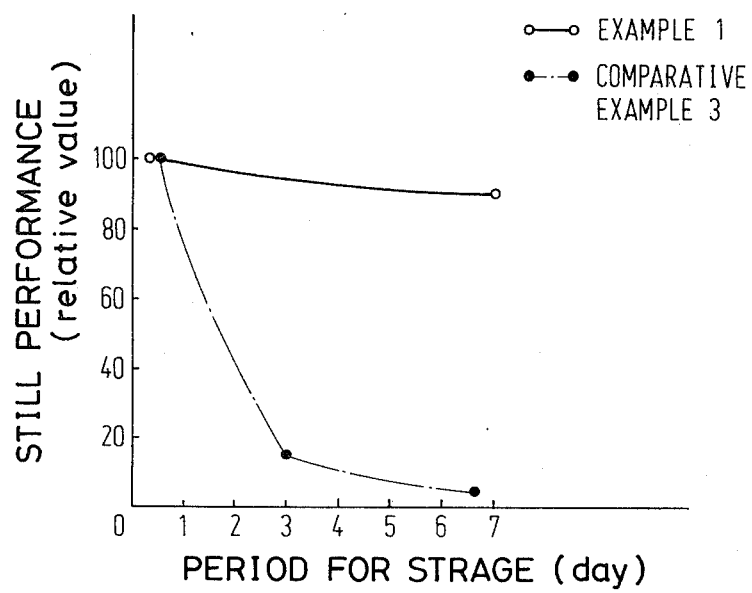
FIG. 2 is a graph illustrating the relationship between "still" performance and periods for storage.

As can be seen in FIG. 2, the tape of Example 1 has a drastically reduced variation in still performance with time.

EXAMPLES 2-5

The procedures of Example 1 were repeated, except that Compound I was replaced by 2.0 parts by weight, each, per 100 parts by weight of gamma-$Fe_2O_3$, of Compound V (Example 2), Compound VI (Example 3), Compound VII (Example 4) and Compound VIII (Example 5).

The results of their performance with respect to still performance and dynamic friction coeficient are shown in Table I Below.

EXAMPLE 6

Figure 3:
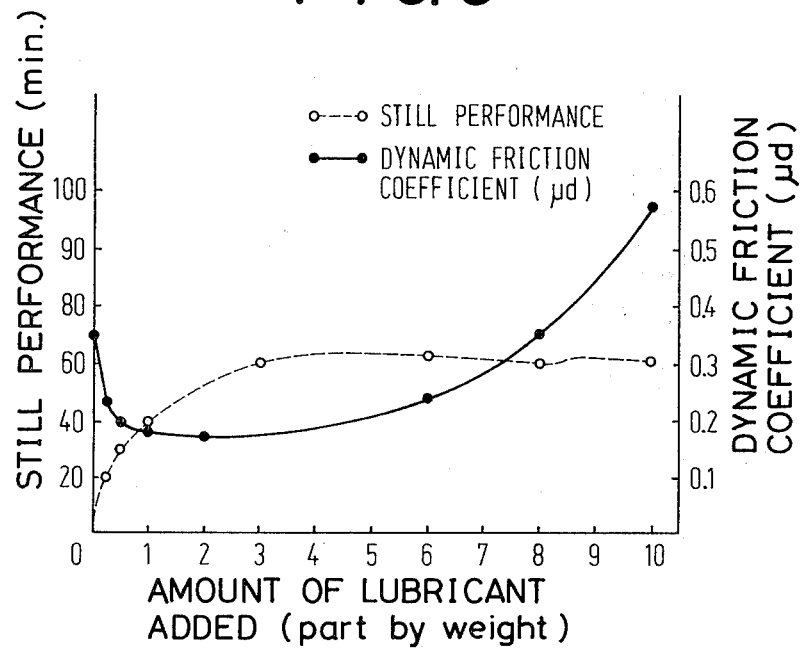
FIG. 3 is a graph illustrating the relationship of "still" performance and dynamic friction coeffiecients with relation to the amounts of lubricants (organo-polysiloxanes) added to the magnetic layer.

The procedures of Example 1 were repeated, except that the amount of Compound I to be employed with the aforesaid magnetic paint composition was varied. The resulting tapes were determined for their still performance and dynamic friction coefficients. The results are shown in FIG. 3. As can be seen from FIG. 3, the preferred amounts of Compound I and hence the organo-polysiloxane compounds of formula (I) is in the range of from about 0.25 to about 7 parts by weight.

Where the amount of Compound I added is lower than 0.25 parts by weight, the still performance became shorter and dynamic friction coefficient increased, while where that amount is greater than 7 parts by weight, the amount of lubricant remaining on the surface of the tape became greater and induced the so-called stick phenomenon which made the dynamic friction coefficient too high to be of practical use.

COMPARATIVE EXAMPLES 1-2

Conventional lubricants were employed with the aforesaid magnetic paint composition for comparative purposes in place of the organo-polysiloxane lubricants employed in Example 1 above. Comparative Example 1 employed dimethylsilicone oil (trade name "KF 96", manufactured by Shin-Etsu Chemical Co., Ltd) and Comparative Example 2 employed methylphenylsilicone oil (trade name "KF 54", manufactured by Shin-Etsu Chemical Co., Ltd.) as lubricants.

The results for their performance are also shown in Table I below for comparative purposes.

COMPARATIVE EXAMPLE 3

The tape was prepared by repeating the procedures of Example 1 with the exception that, in place of Compound I, use was made of an organo-polysiloxane lubricant having the following formula:

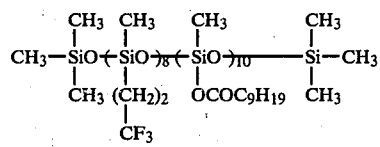

The results of its performance are shown in Table 1 below.

TABLE I

| Tapes | Still Performance (min.)[1] | Dynamic Friction Coefficient ($\mu d$)[2] |
|---|---|---|
| Example 1 | more than 60 | 0.180 |
| Example 2 | " | 0.180 |
| Example 3 | " | 0.200 |
| Example 4 | " | 0.183 |
| Example 5 | " | 0.190 |
| Comparative Example 1 | less than 5 | 0.400 |
| Comparative Example 2 | " | 0.443 |
| Comparative Example 3 | " | 0.200 |

(1) The term "still performance" referred to throughout the specification is defined as the period of time required for reduction of the reproduction output to one-half of the original reproduction output in still mode where an upper rotry cylinder with a magnetic head is rotated while the tape is not transported.

(2) The dynamic friction coefficient ($\mu d$) is measured as follows: A tape of ¼ inch width is contacted with the periphery of a brass cylinder over about a quadrant of the peripheral surface of such cylinder. One end of the tape is horizontally fixed to a support and a weight of 100 grams is fixed to the other free end of the tape to provide a given tension on the latent portion of the tape. The cylinder is then controllably rotated at such a rate that the peripheral speed thereof is 0.75 mm per second relative to the tape. Tension gauges are arranged on the tape between the weight and the cylinder and between the cylinder and the support, respectively, whereby tensions $t_1$ and $t_2$ are then measured. The dynamic friction coefficient ($\mu d$) is then calculated by the following equation:

$$\mu d = \frac{2}{\pi} \log_e \frac{t_2}{t_1}$$

EXAMPLES 7–9

A magnetic layer was formed on the surface of a polyethylene terephthalate by following the procedures of Example 1 with the exception that 1.5 parts by weight of squalane ($C_{30}H_{62}$) was used in place of the lubricant.

On the surface of the magnetic layer provided on the non-magnetic layer was coated a 1% solution in isopropylalcohol of each of Compounds II, III and IV, respectively, as a top coat as shown in FIG. 1B, so as to amount to 43 mg/m².

COMPARATIVE EXAMPLES 4–6

The procedures of Example 7 were followed with the exception that, in place of the organo-polysiloxane lubricants of the formula (I), the conventional lubricants of Comparative Example 1 and Comparative Example 2 and the organo-polysiloxane compound of Comparative Example 3 were employed, for comparative Examples 4 to 6, respectively.

The tapes obtained in Examples 7 to 9 and Comparative Examples 4 to 6, were determined for still performance and dynamic friction coefficient. The test results are shown in Table II below.

TABLE II

| Tapes | Still Performance (min.) | Dynamic Friction Coefficient ($\mu d$) |
|---|---|---|
| Example 7 | more than 60 | 0.220 |
| Example 8 | " | 0.190 |
| Example 9 | " | 0.200 |
| Comparative Example 4 | less than 10 | 0.386 |
| Comparative Example 5 | " | 0.410 |
| Comparative Example 6 | " | 0.187 |

EXAMPLES 10–11

As shown in FIG. 1C a polyethylene terephthalate base (1) is coated with a 0.1% solution in "Freon" of each of Compound 3 (Example 10) and Compound 5 (Example 11), respectively, so as to amount to 2.1 mg/m² as a coating (4) on the surface opposite to the surface on which the magnetic layer is formed.

The surfaces with the coating 4 of the tapes were determined for their dynamic friction coefficient, $\mu d$, respectively, at the first running and the 10th running. The results are shown in Table III.

COMPARATIVE EXAMPLE 7

A tape of Example 10 without any coating containing an organo-polysiloxane lubricant used in accordance with the present invention was prepared and the surface without a coating was tested for its dynamic friction coefficient, $\mu d$. The result is shown in Table III below.

TABLE III

| Tapes | Dynamic Friction Coefficient, $\mu d$ | |
|---|---|---|
| | First Running | 10th Running |
| Example 10 | 0.150 | 0.178 |
| Example 11 | 0.155 | 0.180 |
| Comparative Example 7 | 0.254 | 0.319 |

EXAMPLE 12

A paint composition having the following components was prepared for a back coat to be coated on the surface opposite to the surface on which the magnetic layer was coated:

| Components | Parts by weight |
|---|---|
| Carbon | 100 |
| Polyurethane resin (trade name "Estan 5702") | 50 |
| Epoxy resin (trade name "Epiclon 351", manufactured by Dainippon Ink & Chemical Co., Ltd.) | 50 |
| Methylethylketone | 400 |
| Toluene | 400 |
| "Desmodur L" (trade name of Bayer A.G.) | 20 |

The paint composition was mixed with 4 parts by weight of Compound 7 and coated on the opposite side of a base having a magnetic layer thereon so as to give a dry film thickness of 3 microns as a back coat as shown in FIG. 1D.

The dynamic friction coefficients of a back coat side were found to be as follows:

$\mu d$ (at the first running) = 0.170, and
$\mu d$ (at the 10th running) = 0.175.

COMPARATIVE EXAMPLE 8

A paint composition having the same components as in Example 12 was coated as a back coat on the opposite side of a base having a magnetic layer thereon so as to give a dry film thickness of 3 microns as a back coat.

The dynamic friction coefficients of a back coat side were found to be as follows:

$\mu d$ (at the first running) = 0.225, and
$\mu d$ (at the tenth running) = 0.250

EXAMPLE 13

A coating of Compound 7 was formed on a back coat of the same paint composition as in Comparative Example 7 so as to amount to 43 mg/m² as shown in FIG. 1E. The dynamic friction coefficients of a back coat side of this tape were found to be as follows:

$\mu d$ (at the first running) = 0.165, and
$\mu d$ (at the 10th running) = 0.170.

EXAMPLES 14–15

In a vacuum metallizer maintained at a pressure of $10^{-5}$ to $10^{-6}$ Torr, Co is obliquely deposited on a polyethylene terephthalate base film 12 $\mu m$ thick at an incidence angle of 65° to a thickness of about 1000 Å by high frequency heating method. The resulting magnetic recording tape had the following magnetic properties:

Hc (coersive force) = 900 Oe,
Rs (squareness ratio) = 90%, and
Bm (saturated magnetic flux density) = 10,000 gauss.

On the surface of the magnetic thin layer of the metallized tape was formed as a top coat a coating of each of Compound 1 (Example 14) and Compound 5 (Example 15).

The results of their performance are shown in Table IV below.

TABLE IV

| Tapes | Still Performance (min.) | Dynamic Friction Coefficient ($\mu d$) |
|---|---|---|
| Example 14 | more than 30 | 0.180 |
| Example 15 | " | 0.200 |
| Comparative Example 8* | — | 0.650 |
| Comparative Example 9** | less than 2 | 0.550 |
| Comparative Example 10** | " | 0.560 |

*In Comparative Example 8 a metallized tape without a top coat was measured for dynamic friction coefficient.
**In Comparative Examples 9 and 10, the metallized tapes with a top coat of each of compounds used in Comparative Examples 1 and 2, respectively, were measured for dynamic friction coefficient and still performance.

We claim as our invention:

1. A magnetic recording medium comprising a non-magnetic base and a magnetic layer, in which the non-magnetic base is provided with a layer containing at least one organo-polysiloxane compound represented by the formula (I):

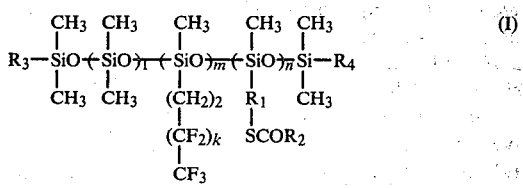

(wherein $R_1$ is a divalent hydrocarbon residue having 1 to 5 carbon atoms; $R_2$ is a monovalent hydrocarbon residue having from 7 to 21 carbon atoms; $R_3$ and $R_4$ may be the same or different and are —$CH_3$, —$(CH_2)_2(CF_2)_kCF_3$ or —$R_1SCOR_2$; k is 0 or an integer ranging from 1 to 12; each of l, m and n is independently 0 or an integer ranging from 1 to 200 and the sum of $1+m+n$ is up to 300, with the proviso that when at least one of $R_3$ and $R_4$ is the group —$R_1SCOR_2$, each of l, m and n may be 0 and that when at least one of $R_3$ and $R_4$ is a group other than the group —$R_1SCOR_2$, each of l and m may be 0 but n is an integer ranging from 1 to 200).

2. A magnetic recording medium according to claim 1, wherein the organo-polysiloxane compound is contained in the magnetic layer.

3. A magnetic recording medium according to claim 1, wherein the organo-polysiloxane compound is contained in a layer provided over the surface of the magnetic layer.

4. A magnetic recording medium according to claim 1, wherein the organo-polysiloxane compound is contained in a layer provided on a surface opposite to the surface of the non-magnetic base on which the magnetic layer is formed.

5. A magnetic recording medium according to claim 1, wherein the organo-polysiloxane compound is contained in a back coat provided on a surface opposite to the surface of the non-magnetic base on which the magnetic layer is formed.

6. A magnetic recording medium according to claim 5, wherein the organo-polysiloxane compound is contained in a layer provided on the surface of the back coat.

7. A magnetic recording medium according to claim 1, wherein the organo-polysiloxane compound is one in which the group —$R_1SCOR_2$ is —$C_3H_6SCOC_{17}H_{35}$, $R_3$ and $R_4$ are —$C_3H_6SCOC_{17}H_{35}$, k is 0, l is 10, m is 8, and n is 28.

8. A magnetic recording medium according to claim 1, wherein the organo-polysiloxane compound is one in which the group —$R_1SCOR_2$ is —$C_3H_6SCOC_{11}H_{23}$, $R_3$ and $R_4$ are —$CH_3$, k is 0, l is 36, m is 0, and n is 12.

9. A magnetic recording medium according to claim 1, wherein the organo-polysiloxane compound is one in which the group —$R_1SCOR_2$ is —$C_3H_6SCOC_{17}H_{35}$, $R_3$ and $R_4$ are —$CH_3$, k is 0, l is 36, m is 0, and n is 12.

10. A magnetic recording medium according to claim 1, wherein the organo-polysiloxane compound is one in which the group —$R_1SCOR_2$ is —$C_3H_6SCOC_{11}H_{23}$, $R_3$ and $R_4$ are —$C_3H_6SCOC_{11}H_{23}$ k is 0, l is 85, m is 30, and n is 33.

11. A magnetic recording medium according to claim 1, wherein the organo-polysiloxane compound is one in which the group —$R_1SCOR_2$ is —$C_3H_6SCOC_{17}H_{35}$, $R_3$ and $R_4$ are —$C_3H_6SCOC_{17}H_{35}$, k is 0, l is 85, m is 30, and n is 33.

12. A magnetic recording medium according to claim 1, wherein the organo-polysiloxane compound is one in which the group —$R_1SCOR_2$ is —$C_3H_6SCOC_{21}H_{43}$, $R_3$ and $R_4$ are —$C_3H_6SCOC_{21}H_{43}$, k is 0, l is 85, m is 30, and n is 33.

13. A magnetic recording medium according to claim 1, wherein the organo-polysiloxane compound is one in which the group —$R_1SCOR_2$ is —$CH_2SCOC_{17}H_{35}$, $R_3$ and $R_4$ are —$CH_2SCOC_{17}H_{35}$, k is 3, l is 100, m is 50, and n is 98.

14. A magnetic recording medium according to claim 1, wherein the organo-polysiloxane compound is one in which the group —$R_1SCOR_2$ is —$C_3H_6SCOC_{17}H_{35}$, $R_3$ and $R_4$ are —$C_3H_6SCOC_{17}H_{35}$, k is 8, l is 85, m is 10, and n is 53.

* * * * *